(12) United States Patent
Huang et al.

(10) Patent No.: US 7,899,409 B2
(45) Date of Patent: Mar. 1, 2011

(54) APPARATUS FOR CONTROLLING IMPEDANCE

(75) Inventors: Carol Barrett Huang, Mountain View, CA (US); Edwin X. Li, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1258 days.

(21) Appl. No.: 11/341,382

(22) Filed: Jan. 30, 2006

(65) Prior Publication Data

US 2007/0207746 A1 Sep. 6, 2007

(51) Int. Cl.
*H04B 1/44* (2006.01)

(52) U.S. Cl. ............. 455/78; 455/83; 455/107; 455/80; 455/319; 455/333; 455/341; 333/104; 333/105; 330/302; 330/327

(58) Field of Classification Search ............ 455/78, 455/83, 82, 107, 80, 319, 333, 341; 333/104, 333/105; 330/327, 302

See application file for complete search history.

(56) References Cited

U.S. PATENT DOCUMENTS

| | | | |
|---|---|---|---|
| 3,784,932 A * | 1/1974 | Wisherd ........................ 333/127 |
| 5,375,256 A * | 12/1994 | Yokoyama et al. ............. 455/80 |
| 5,548,246 A * | 8/1996 | Yamamoto et al. ............. 330/51 |
| 5,678,199 A * | 10/1997 | Birth et al. ..................... 455/80 |
| 5,903,820 A * | 5/1999 | Hagstrom ....................... 455/82 |
| 6,009,314 A * | 12/1999 | Bjork et al. .................... 455/83 |
| 6,026,280 A * | 2/2000 | Yokomura ...................... 455/78 |
| 6,121,809 A * | 9/2000 | Ma et al. ........................ 327/246 |
| 6,127,887 A | 10/2000 | Cho |
| 6,166,599 A * | 12/2000 | Aparin et al. .................. 330/149 |
| 6,226,275 B1 * | 5/2001 | Yang et al. ..................... 370/280 |
| 6,301,467 B1 * | 10/2001 | Jarvinen et al. ................. 455/80 |
| 6,629,843 B1 * | 10/2003 | Bunting et al. ................ 434/118 |
| 6,735,418 B1 | 5/2004 | MacNelly et al. |
| 6,919,858 B2 * | 7/2005 | Rofougaran .................... 343/850 |
| 7,170,465 B2 * | 1/2007 | Rofougaran .................... 343/850 |
| 7,206,553 B2 * | 4/2007 | Meck ............................. 455/91 |
| 7,209,727 B2 * | 4/2007 | Castaneda et al. ............. 455/341 |
| 7,265,643 B2 * | 9/2007 | Toncich ........................ 333/24.2 |
| 7,274,913 B2 * | 9/2007 | Marholev et al. ............... 455/78 |
| 7,283,793 B1 * | 10/2007 | McKay ........................... 455/83 |
| 7,369,096 B2 * | 5/2008 | Castaneda et al. ............. 343/859 |
| 7,486,135 B2 * | 2/2009 | Mu ................................ 330/51 |
| 2005/0176380 A1 * | 8/2005 | Okabe et al. ................... 455/73 |
| 2005/0208901 A1 * | 9/2005 | Chiu et al. ..................... 455/78 |
| 2005/0225397 A1 * | 10/2005 | Bhatia et al. ................... 330/311 |
| 2006/0084392 A1 * | 4/2006 | Marholev et al. ............... 455/78 |
| 2006/0160505 A1 * | 7/2006 | Ichitsubo et al. .......... 455/127.1 |
| 2006/0170492 A1 * | 8/2006 | Sheng-Fuh et al. ........... 330/129 |
| 2006/0189286 A1 * | 8/2006 | Kyu et al. ..................... 455/144 |
| 2006/0290421 A1 * | 12/2006 | Ichitsubo et al. ............... 330/66 |
| 2007/0132510 A1 * | 6/2007 | Osman et al. .................. 330/51 |

* cited by examiner

*Primary Examiner* — Marceau Milord
(74) *Attorney, Agent, or Firm* — Sterne, Kessler, Goldstein & Fox P.L.L.C.

(57) ABSTRACT

A transceiver is described that includes a power amplifier (PA), a low noise amplifier (LNA), and an impedance matching circuit having a first and second differential output node. The first and second differential output nodes are coupled to outputs of the PA and to inputs of the LNA. The impedance matching circuit provides a load impedance to the outputs of the PA. The transceiver further includes a first impedance device having an output impedance coupled between the first and second differential output nodes. In this way, the combination of the output impedance and the load impedance matches with an impedance at the inputs of the LNA.

25 Claims, 10 Drawing Sheets

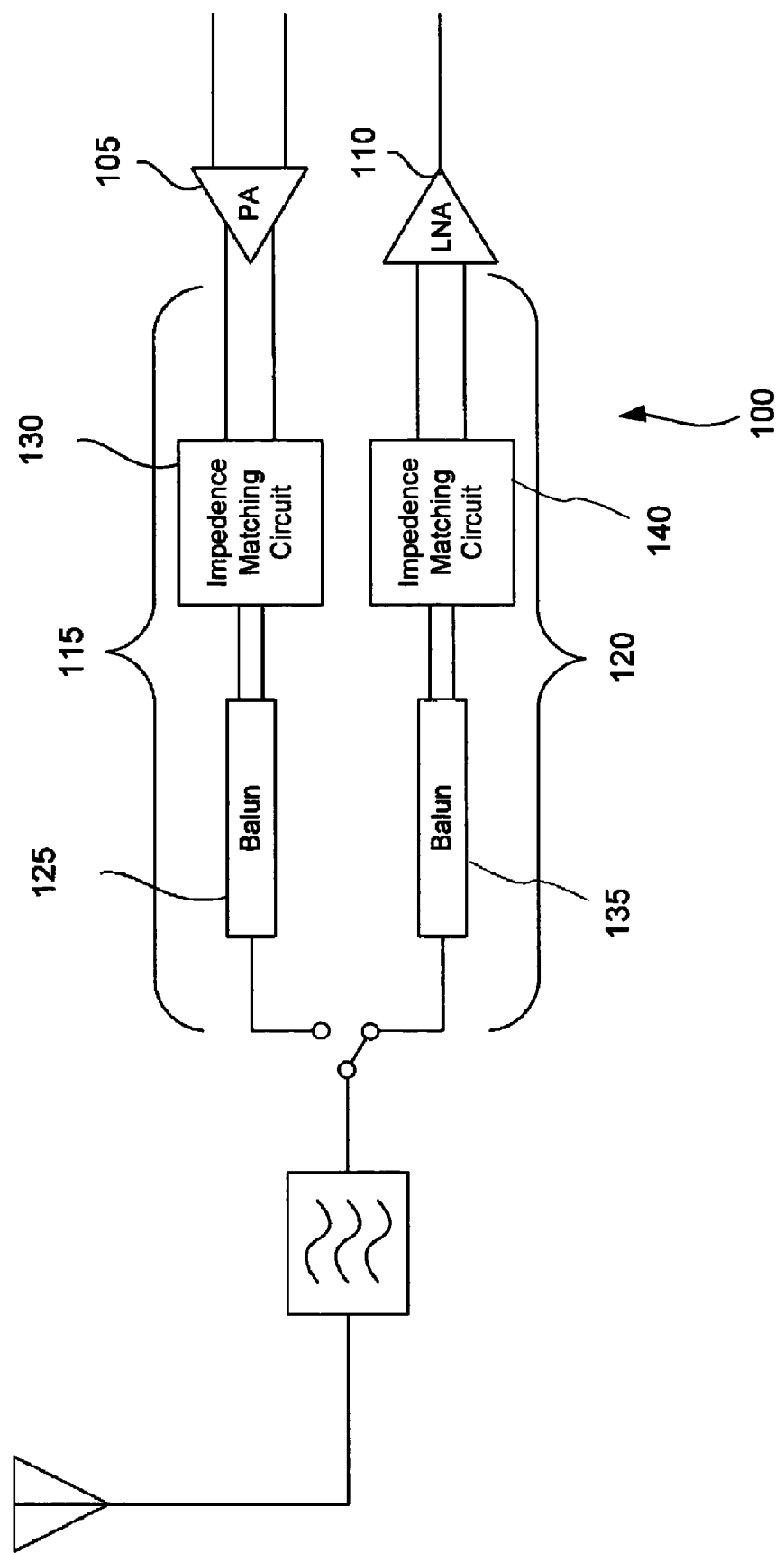
FIG. 1
Conventional

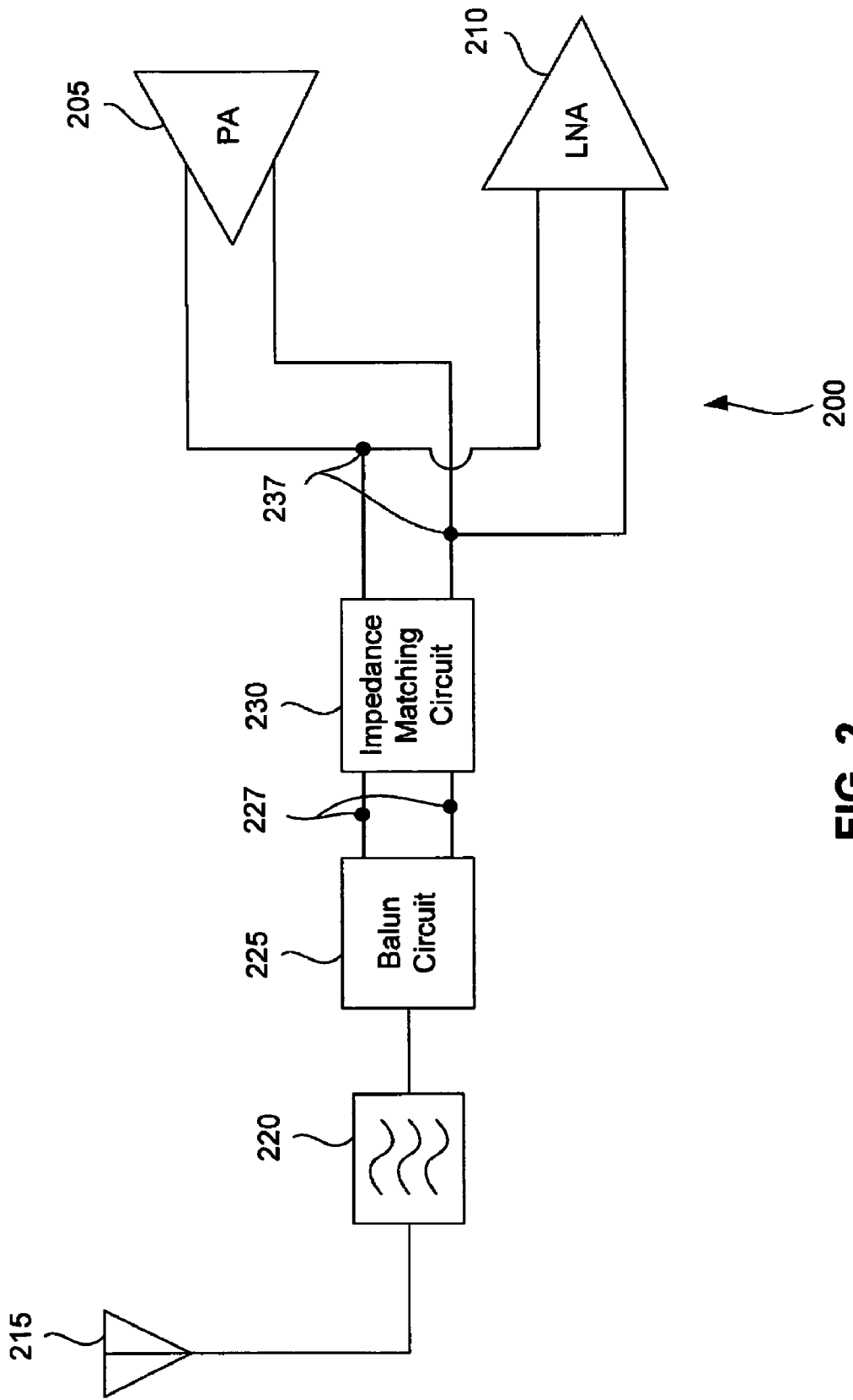
FIG. 2
Conventional

APPARATUS FOR CONTROLLING IMPEDANCE

FIELD OF THE INVENTION

The invention relates to a transceiver with impedance control.

BACKGROUND OF THE INVENTION

Impedance matching between transmission lines and circuit components is important for optimum circuit performance. Transmission line impedance matching is especially important in a radio frequency (RF) transceiver. Impedance mismatch causes power loss due to signal reflections at the transmission line and circuit component interface, resulting in degraded signal to noise ratio. For optimum performance and maximum power transfer, the impedance across a power amplifier's (PA) output terminals should be power matched to the impedance of transmission lines from the PA to the antenna. Similarly, for optimum performance and low noise operation, the impedance across a low noise amplifier's (LNA) input terminals should be matched to the impedance of transmission lines leading to the LNA's input terminals.

FIG. 1 illustrates a system 100 using a conventional path switching technique to provide impedance matching to a PA 105 and a LNA 110 of a RF transceiver. In transmit mode, system 100 switches to a transmission path 115 that is specifically configured to provide an impedance value that is best suited for PA 105. Path 115 includes a balun circuit 125 and an impedance matching circuit 130. Impedance matching circuit 130 provides a fixed impedance across the output terminals of PA 105. Balun circuit 125 converts differential balanced signals from PA 105 into single-ended signals for transmission by the antenna.

In receive mode, system 100 switches to another transmission path 120. Transmission path 120 is specifically configured to match its impedance with the impedance of the input terminals of LNA 110 using an impedance matching circuit 140. Path 120 further includes a balun circuit 135 that converts single-ended RF signals to differential balanced signals. As shown in FIG. 1, system 100 is expensive and has a large footprint due to the number of components used.

FIG. 2 illustrates a system 200 for providing impedance matching to a PA and LNA of a transceiver. System 200 includes a PA 205, a LNA 210, an antenna 215, a band pass filter 220, a balun circuit 225, and an impedance matching circuit 230. In receive mode, RF signals are received by antenna 215. The received RF signals are then filtered to remove unwanted frequencies by filter 220. At this point, the RF signals are single-ended signals, which are converted into differential balanced signals using balun circuit 225. Balun circuit 225 is also used to convert differential balanced signals from PA 205 into single-ended signals for transmission by antenna 215, in transmit mode.

In system 200, impedance matching circuit 230 provides impedance matching to PA 205 and LNA 210. However, the impedance match provided by circuit 230 is fixed for both transmit and receive modes. Therefore, the impedance matching cannot be optimized for both PA 205 and LNA 210. Circuit 230 matches the impedance between nodes 227 and 237 using transmission lines or a plurality of capacitors and inductors. For further detail on an impedance matching system similar to system 200, see U.S. Pat. No. 6,735,418, "Antenna Interface", to MacNally et al., which is incorporated by reference in its entirety.

System 200 is an improvement over system 100. However, for certain RF frequencies or under certain conditions, system 200 does not provide optimum impedance matching for both PA 205 and LNA 210. Accordingly, what is needed is a transceiver with an improved impedance matching system.

BRIEF DESCRIPTION OF THE DRAWINGS/FIGURES

The present invention is described with reference to the accompanying drawings.

FIG. 1 illustrates a diagram of a transceiver with a conventional impedance matching technique.

FIG. 2 illustrates a diagram of a transceiver with another known impedance matching technique.

DETAILED DESCRIPTION OF THE INVENTION

Figure 3:
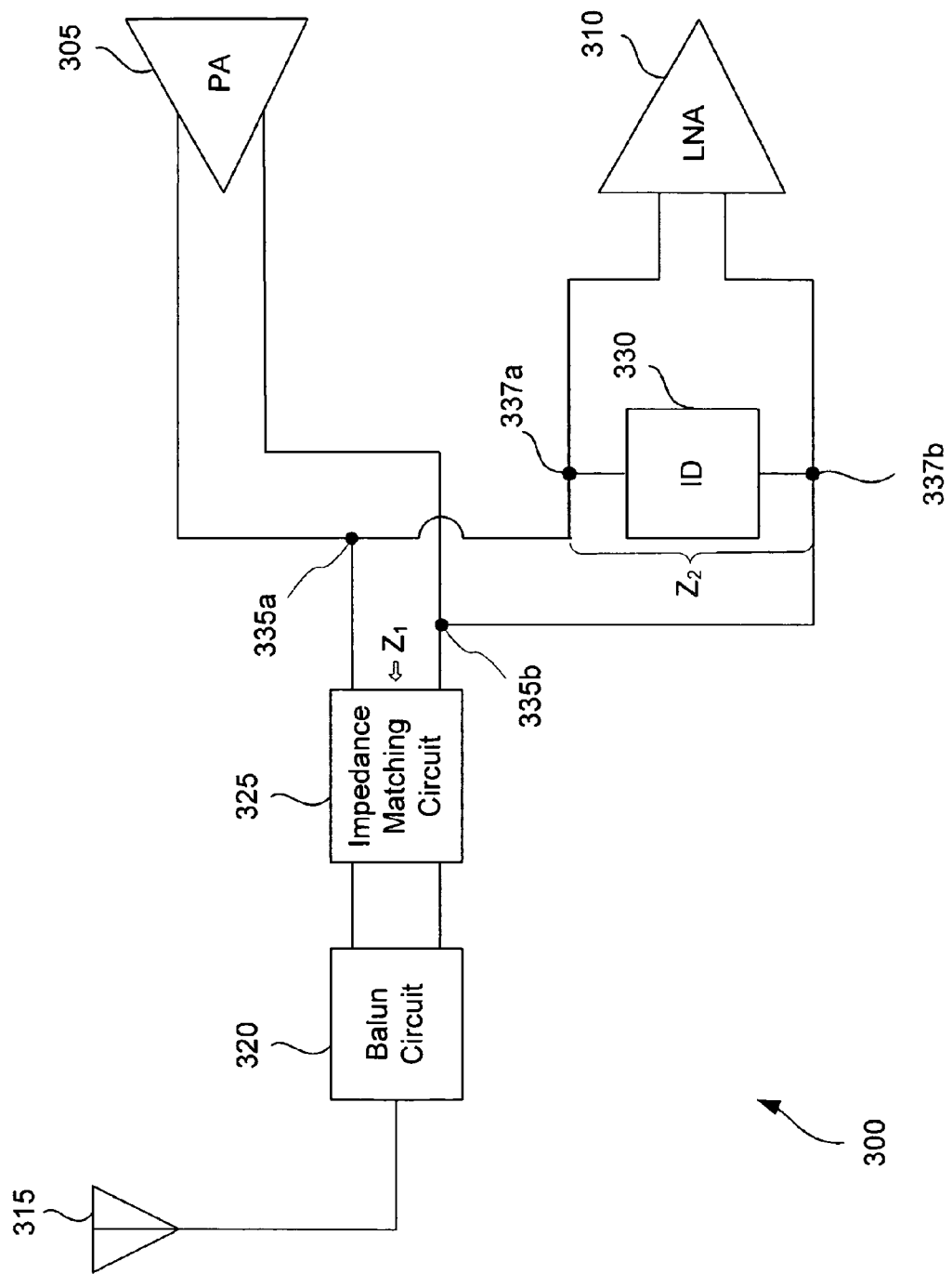
FIGS. 3-9 illustrate diagrams of transceiver with impedance matching technique according to embodiments of the present invention.

This specification discloses one or more embodiments that incorporate the features of this invention. The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described. An embodiment of the present invention is now described. While specific methods and configurations are discussed, it should be understood that this is done for illustration purposes only. A person skilled in the art will recognize that other configurations and procedures may be used without departing from the spirit and scope of the invention.

In a conventional system, such as system 100, each of the PA and LNA has its own impedance matching network. An alternative solution, such as one provided by system 200, is to combine the multiple impedance matching networks into a single matching network that includes a balun circuit and an impedance matching circuit. This leads to significant savings in circuit components and die area, and therefore cost. Because system 200 is no longer optimized for the PA and LNA individually, as in the solution provided by system 100, it can have performance issues such as power loss and increased noise.

In a transceiver, the PA and the LNA separately prefer to see different impedance across its output and input terminals, respectively. Consequently, impedance matching circuit 230 is typically fine tuned to work optimally with either PA 205 or LNA 210. For example, most transceivers are configured to operate optimally (minimum signal loss and noise figure) with the LNA by matching node 237 to a 50Ω load using the impedance matching circuit 230. In other words, the impedance matching circuit is configured to transform the LNA input impedance to 50Ω at the antenna. In this way, the LNA sees the optimum impedance, $Z_{ln_{aopt}}$ across its input terminals. In the instance where the LNA sees an impedance much higher or lower than the preferred $Z_{ln_{aopt}}$, an impedance mismatch occurs. Impedance mismatch causes bad signal reception due to high signal reflection.

In a transceiver, the preferred PA output load depends on the output power, power consumption, and linearity requirements. Numbers can typically range from 50 to 500Ω or larger, and may require a reactive component for the best power match. However, in a conventional transceiver design where the PA output and LNA input are combined, like the design in system 200, the performance of the PA is sacrificed in order to achieve optimum LNA performance because the PA is not optimally matched at node 237. As such, the LNA is a constraint because it limits the ability to maximize the performance of the PA by limiting the impedance match to $Z_{lnaopt}$ at node 237. For example, if impedance matching circuit 230 of system 200 is configured to provide a $Z_{paopt}$ matching across nodes 237, then system 200 would no longer be optimum for LNA 210 in the receive mode because when $Z_{paopt}$ is transformed to the antenna, it is not necessarily 50Ω, causing an impedance mismatch at the antenna.

The present invention provides optimum impedance matching for both the PA and the LNA by allowing for greater impedance matching flexibility at the PA's outputs and at the same time provides the preferred impedance across the LNA's inputs.

FIG. 3 illustrates a block diagram of a transceiver 300 according to an embodiment of the present invention. Transceiver 300 includes a PA 305, a LNA 310, an antenna 315, a balun circuit 320, an impedance matching circuit 325, and an impedance adjustment device 330. Transceiver 300 may also include a bandpass filter (not shown).

In transceiver 300, impedance matching circuit 325 is configured to match the impedance across the PA's 305 output terminals such that PA 305 may operate at its optimum level. In other words, impedance matching circuit 325 is configured to transform balun circuit 320 impedance to that desired by PA 305 at the transmit frequency. In an embodiment, impedance matching circuit 325 provides a complex impedance of $Z_{paopt}$ across nodes 335. In this way, PA 305 may operate more efficiently and provide maximum power transfer to antenna 315. Further, nodes 335 are coupled to the output and input terminals of PA 305 and LNA 310, respectively. In this way, LNA 310 would also see an impedance of $Z_{paopt}$ across its input terminals, absent the impedance device 330.

As discussed, the LNA of a transceiver prefers to see an impedance of $Z_{lnaopt}$ across its input terminals. In other words, $Z_{lnaopt}$ could be called the preferred LNA impedance. Similarly, $Z_{paopt}$ could be called the preferred PA impedance. To achieve the preferred LNA impedance, impedance device 330 is coupled in parallel to nodes 335, across nodes 337 as this is across the input terminals of LNA 310.

When transceiver 300 is in receive mode, impedance device 330 is "on" and exhibits an impedance of $Z_2$ across its output nodes 337. The impedance $Z_2$ is parallel to the outputs impedance $Z_1$, of matching circuit 325 at nodes 335. In this way, the equivalent impedance is $Z_{eq}=Z_1Z_2/Z_1+Z_2$. $Z_{eq}$ is preferably $Z_{lnaopt}$, which is the optimum impedance for LNA 310. In an embodiment, $Z_1$ is larger than 167Ω, and impedance device 330 is configured to give an impedance of $Z_2$ such that $Z_{eq}$ is approximately $Z_{lnaopt}$=167Ω. For example, if $Z_1$ is 450Ω, then impedance matching circuit 330 is configured such that $Z_2$ is 266Ω. In this instance, $Z_{eq}$ is approximately 167Ω. It should be understood that all impedances given in this example contain a real and imaginary component, but are given as real impedances for simplicity.

In transmit mode, impedance device 330 exhibits a very large impedance across its output nodes 337. In essence, impedance device 330 acts like an open circuit or is "off". In this instance, $Z_2$ is very large thus yielding, $Z_{eq} \sim Z_1$, or approximately 450Ω in this example. Although nodes 335 and 337 are described as separate nodes, it should be understood both nodes are electrically the same node. Nodes 335 and 337 are shown and discussed separately for ease of illustration.

Figure 4:
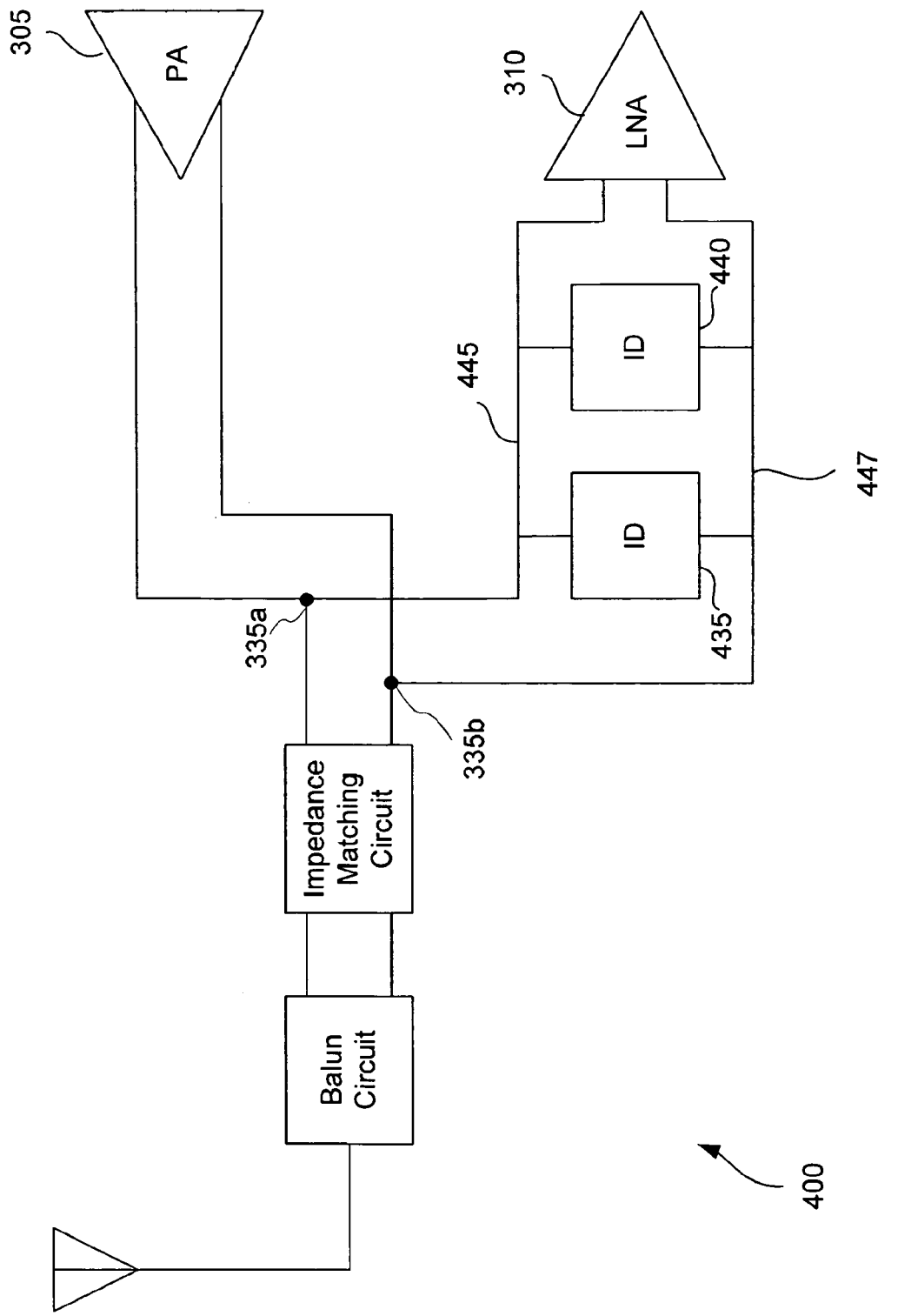

FIG. 4 illustrates another block diagram of a transceiver 400 according to an embodiment of the present invention. Transceiver 400 is similar to transceiver 300 and may include all of the features of transceiver 300; however, transceiver 400 includes two impedance devices 435 and 440 instead of one. Impedance devices 435 and 440 are both coupled in parallel to nodes 335a and 335b or to the input terminals of LNA 310. Further, impedance devices 435 and 440 are configured such that LNA 310 experiences a balanced differential load on transmission lines 445 and 447. This feature will be further discussed in detail herein. Further, it should be understood by one skilled in the art that impedance devices 435 and 440 may be adjusted such that a desired $Z_{eq}$ is obtained.

Figure 5:
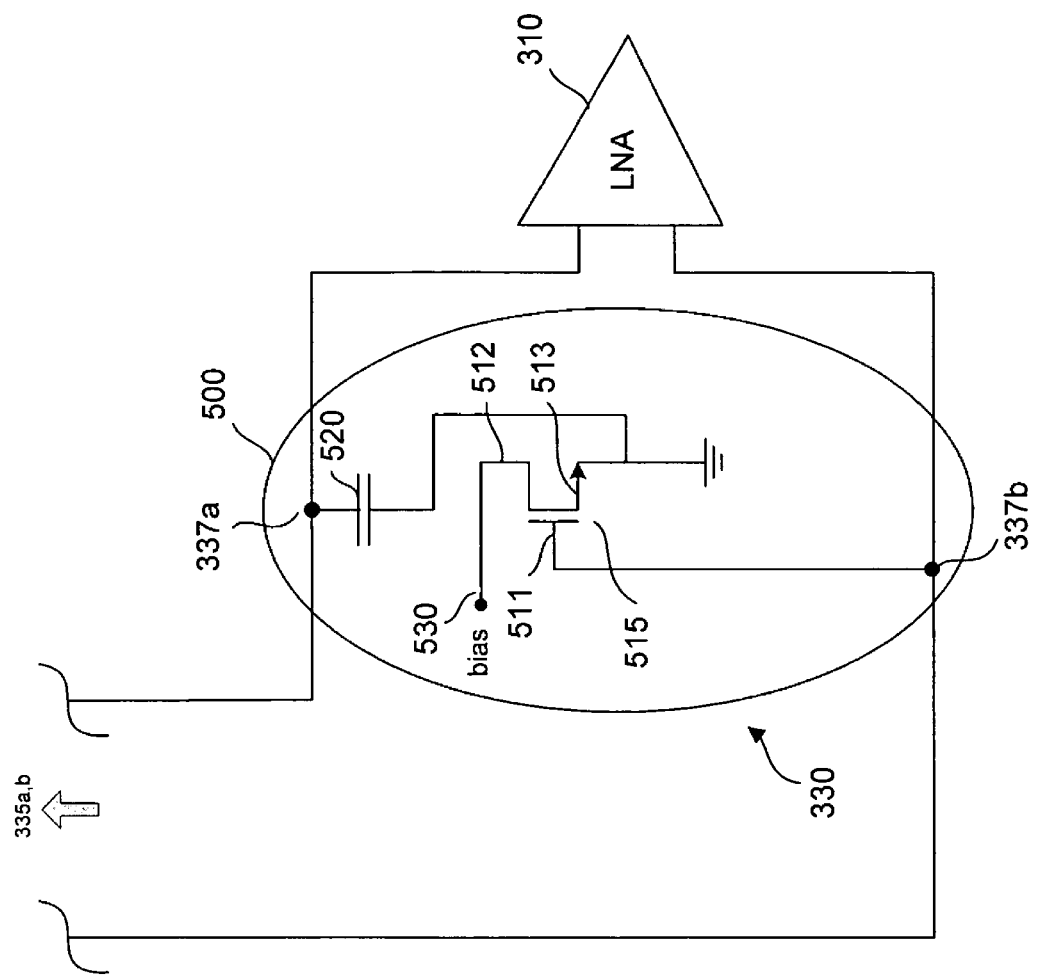

FIG. 5 illustrates an impedance device 500, which is an embodiment of impedance device 330. Impedance device 500 includes a transistor 515, a capacitor 520, and a biasing source 530. Transistor 515 includes a gate 511, a drain 512, and a source 513. In device 330, gate 511 is coupled to a differential node 337b, and source 513 is coupled to capacitor 520 which is coupled to a differential node 337a. Further, drain 512 is coupled to biasing source 530. It should be understood by one skilled in the art that impedance device 330 may be modified to operate with a different type of biasing source 530. In this way, biasing source 530 may be a voltage source or a current source. When gate 511 is biased with respect to source 513 (by more than Vt), current flows from drain 512 to a source 513. The voltage change across gate 511 and source 513 ($V_{gs}$) induces a current flow from drain 512 to source 513 ($I_{ds}$) The ratio $\partial V_{gs}/\partial I_{ds}$ represents the transconductance ($g_m$) of transistor 515. The impedance across nodes 337a and 337b is equivalent to the $1/g_m$ of transistor 515. Accordingly, the impedance across nodes 337a and 337b varies as the reciprocal of the transconductance of transistor 515. In this way, impedance device 500 may accurately control the impedance across nodes 337a and 337b by controlling the gm.

Impedance device 500 may also be a switch coupled in series with a variable resistor. However, this implementation is noisy and is difficult to control with high precision. Even though a transistor and a resistor are described, any other impedance devices or combination of devices could also be used to provide impedance control as would be understood by one skilled in the art.

Figure 6:
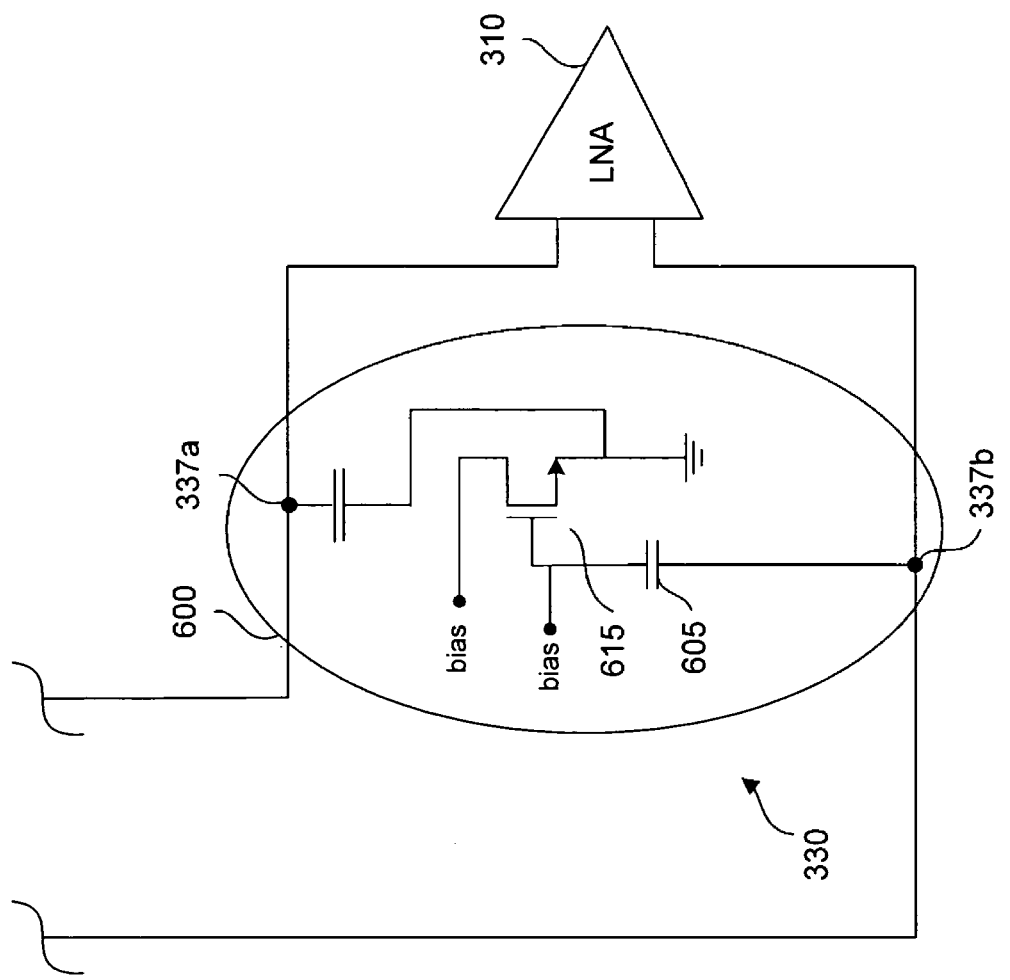

FIG. 6 illustrates an impedance device 600, which is another embodiment of impedance device 330. Device 600 is similar to device 500 and may include every feature of device 500. However, device 600 further includes a capacitor 605 that is coupled between the gate of the transistor and node 337b. Capacitor 605 acts as a DC filter, thus making the gate bias of the transistor independent of the DC bias on node 337b, allowing for more flexibility in the design. In a preferred embodiment, the $1/g_m$ of transistor 615 is approximately 266Ω across nodes 337a and 337b when device 600 is in receive mode. In this instance, the impedance seen by the input terminals of LNA 610 is approximately 166 Ω.

Figure 7:
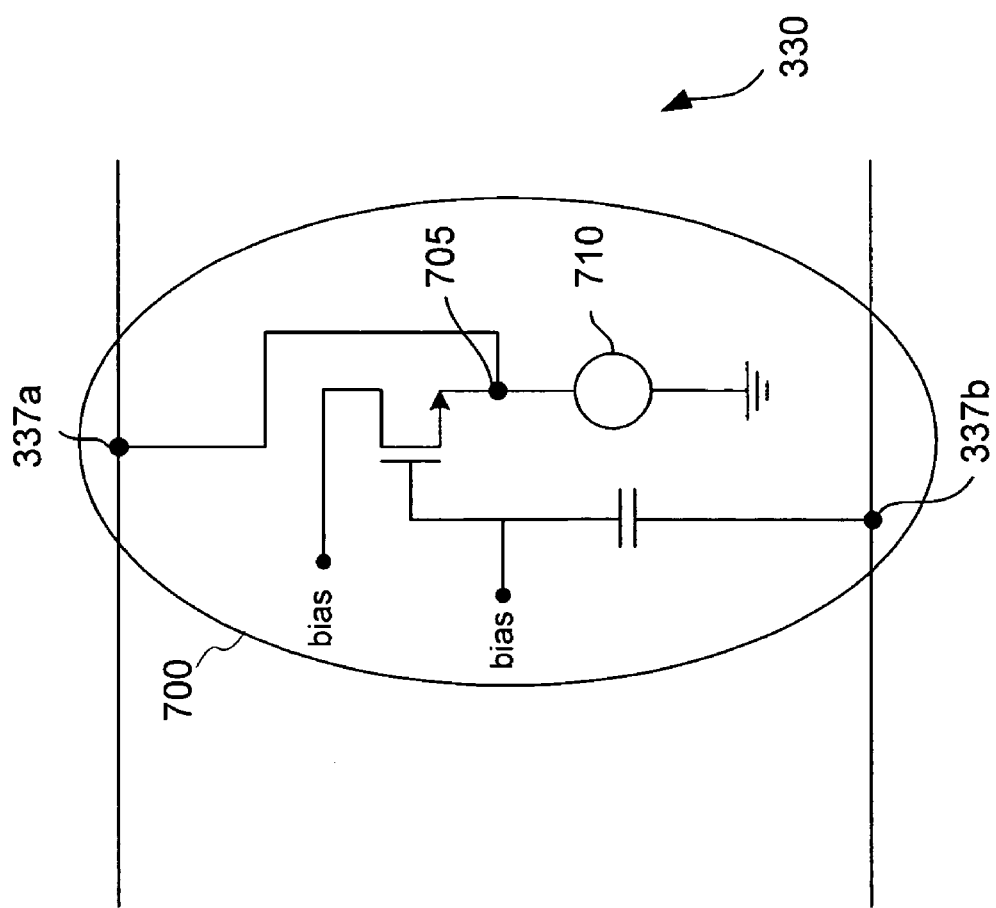

FIG. 7 illustrates an impedance device 700, which is an embodiment of impedance device 330. Impedance device 700 may include every features of impedance device 600. Additionally, impedance device 700 includes a biasing source 710 coupled between a ground and the source of the transistor via a node 705. It should be understood by one skilled in the art that impedance device 700 may be modified to operate with different type of biasing source 710.

Figure 8:
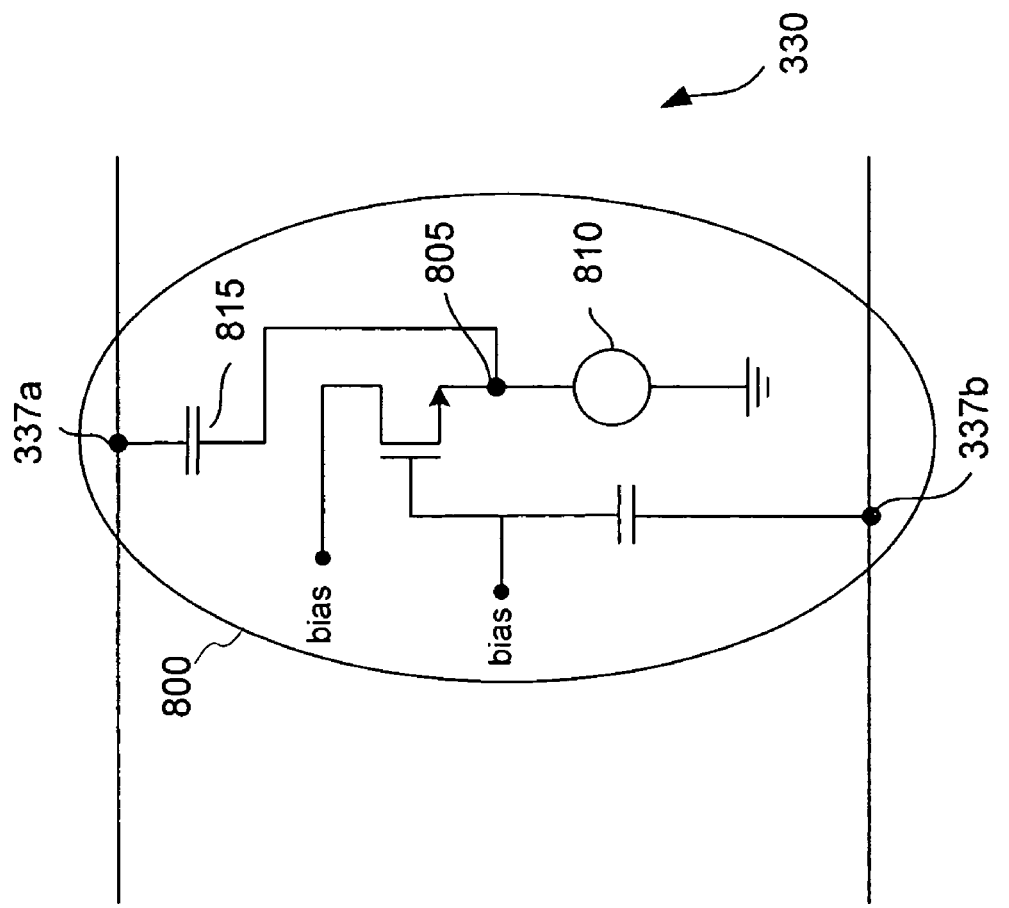

FIG. 8 illustrates an impedance device 800, which is an embodiment of impedance device 330. Impedance device 800 may include every features of impedance device 700. Additionally, impedance device 800 includes a voltage biasing source 810 coupled between a ground and the source of the transistor via a node 805 and a storage element 815 coupled between nodes 337a and 805.

Figure 9:
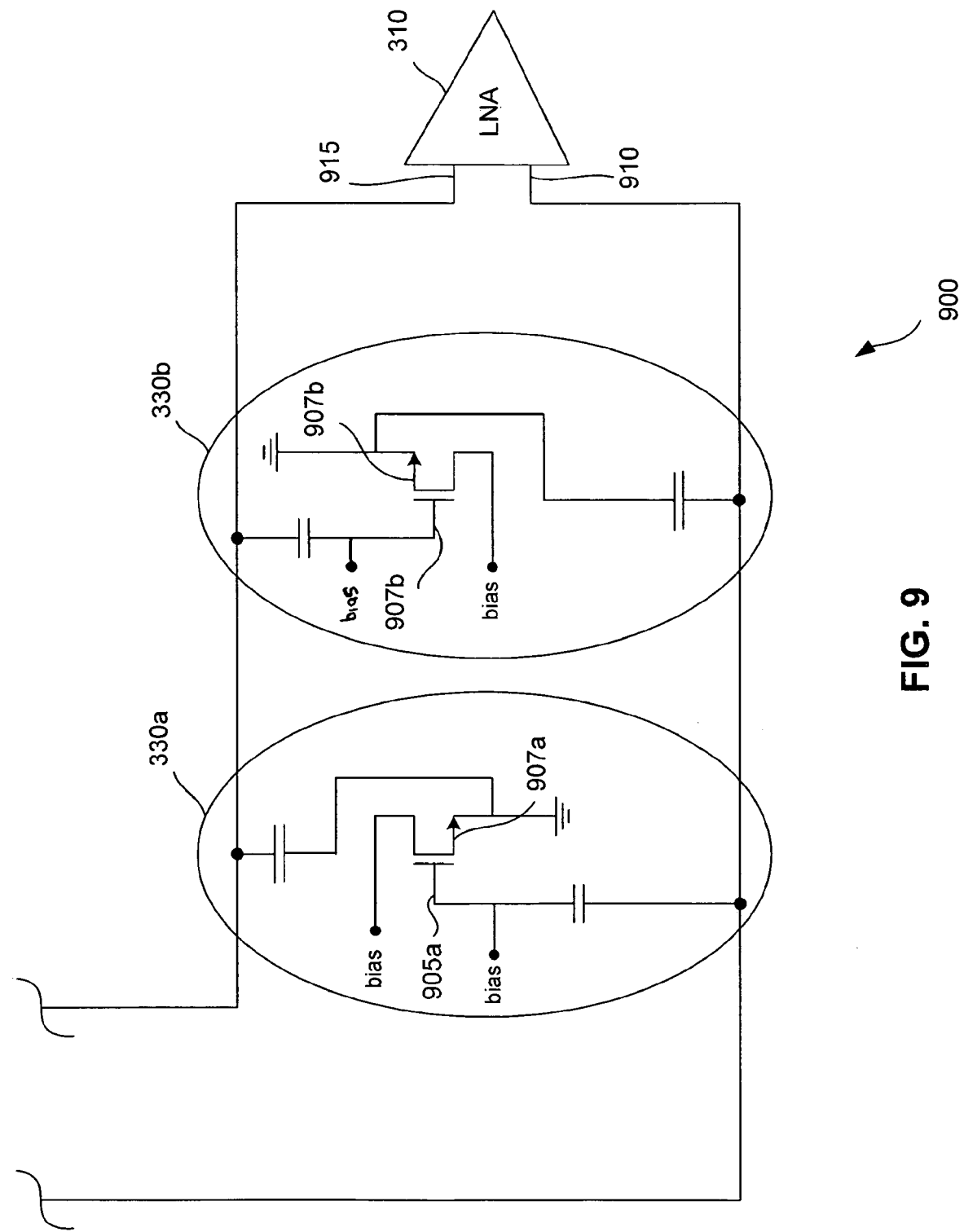

FIG. 9 illustrates a transceiver 900 having two impedance devices 330a and 330b. Impedance devices 330a and 330b may include every features of impedance device 800. In an embodiment, impedance devices 330a and 330b are identical. However, the orientation of device 330b is flipped with respect to the orientation of device 330a. For example, a gate terminal 905a of device 330a is coupled to an input terminal 910 of LNA 310, and gate terminal 805b of device 330b is coupled to a second input terminal 915 of LNA 310. Further, source 907a is coupled to input 915, and source 907b is coupled to input 910. In this way, devices 330a and 330b may provide balanced loading across the LNA's 310 input terminals. In an embodiment, transceiver 900 may have more than two impedance devices 330, preferably in a multiple of two.

Figure 10:
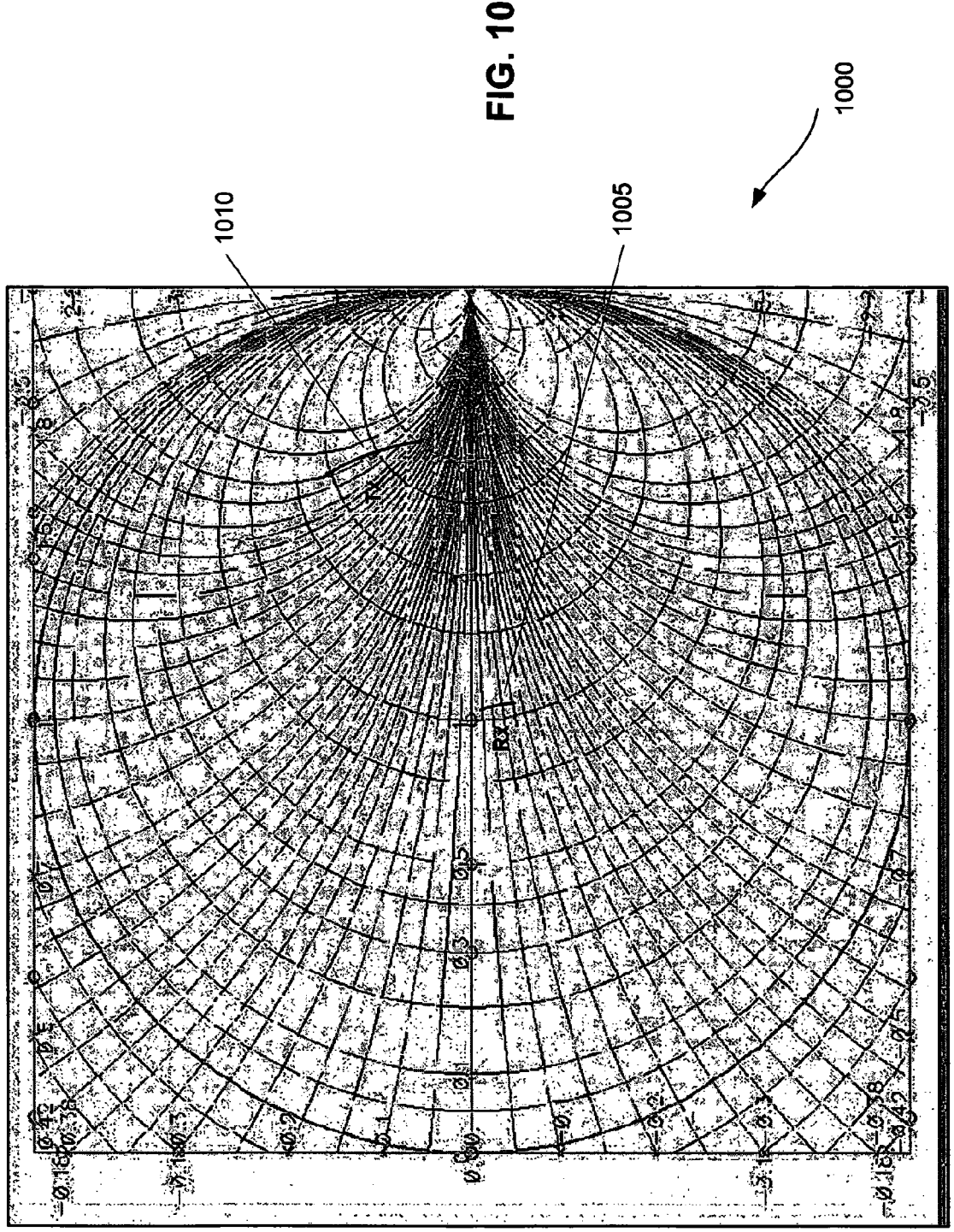
FIG. 10 illustrates a Smith chart of a transceiver according to an embodiment of the present invention.

FIG. 10 illustrates a Smith Chart 1000 showing a plot of the scattering parameters (s-parameters) in receive and transmit mode of a transceiver utilizing an embodiment of impedance device 330. As illustrated in FIG. 10, the s-parameters Rx arc 1005 is near the origin of the chart where r is equal to 1 (r=1) and the reflection coefficient is very small. In this instance, the LNA input terminals are closely matched to 50Ω at the antenna. In transmit mode, the impedance device 330, as illustrated by the Tx arc 1010, is highly resistive and reactive. In this way, device 330 acts like an open circuit and exhibits a high impedance as desired by the PA outputs.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

We claim:

1. A transceiver comprising:
a power amplifier (PA);
a low noise amplifier (LNA);
an impedance matching circuit having a first and second differential output nodes coupled to outputs of the PA and to inputs of the LNA, wherein the impedance matching circuit provides a load impedance to the outputs of the PA; and
a first impedance device having an adjustable output impedance coupled between the first and second differential output nodes, wherein a combination of the output impedance and the load impedance matches with an impedance at the inputs of the LNA.

2. The transceiver of claim 1, wherein the first impedance device is off when the transceiver is in transmit mode.

3. The transceiver of claim 1, wherein the first impedance device is on when the transceiver is in receive mode.

4. The transceiver of claim 1, wherein the first impedance device comprises:
a transistor having a source, a drain, and a gate, the source coupled to the first differential output node and a ground, the drain coupled to a first biasing source, the gate coupled to the second differential output node, whereby the impedance of the first impedance device is affected by a voltage change across the gate and the source and by a change in current flow from the drain to the source.

5. The transceiver of claim 4, wherein the first impedance device further comprising:
a storage element having a first and second terminal, the first terminal being coupled to the first differential output node, the second terminal being coupled to the source of the transistor.

6. The transceiver of claim 5, wherein the first impedance device further comprises:
a second biasing source coupled between the second terminal of the storage element and the ground.

7. The transceiver of claim 6, wherein the storage element is a capacitor with the first terminal being the positive terminal.

8. The transceiver of claim 4, wherein the first biasing source is a current source.

9. The transceiver of claim 4, wherein the first biasing source is a voltage source.

10. The transceiver of claim 4, wherein the second biasing source is a current source.

11. The transceiver of claim 4, wherein the first impedance device further comprising:
a storage element coupled between the gate and the second differential output node.

12. The transceiver of claim 11, wherein the first impedance device further comprises:
a second biasing source coupled to the source between the first differential node and the ground.

13. The transceiver of claim 12, wherein the first impedance device further comprises: a storage element coupled between the first node and the source of the transistor; and wherein the second biasing source is a voltage source.

14. The transceiver of claim 4, wherein the first impedance device further comprising:
a first storage element having a first and second terminal, the first terminal being coupled to the first differential output node, the second terminal being coupled to the source of the transistor;
a second storage element coupled between the gate and the second differential output node.

15. The transceiver of claim 14, wherein the first storage element is an electrolytic capacitor with the first terminal being the positive terminal.

16. The transceiver of claim 4, wherein the transistor is MOS transistor.

17. The transceiver of claim 4, wherein the transistor is bipolar transistor.

18. The transceiver of claim 4, further comprising:
a second impedance device being coupled in parallel to the first impedance device, the second impedance device comprising:
a second transistor having a second source and a second gate, the second source being coupled to the second differential output node, and the second gate being coupled to the first differential output node.

19. The transceiver of claim 1, further comprising:
a second impedance device being coupled in parallel to the first impedance device.

20. The transceiver of claim 19, further comprising:
at least two of the first impedance device being coupled in parallel; and at least two of the second impedance device being couple coupled in parallel such that there is an even number of the first and second impedance devices for providing a balanced load to the first and second differential node.

21. The transceiver of claim 1, wherein the output impedance of the first impedance device is based on the load impedance of the impedance matching circuit.

22. The transceiver of claim 21, wherein the output impedance of the first impedance device is based on the load impedance of the impedance matching circuit and the impedance at the input of the LNA.

23. The transceiver of claim 1, wherein the load impedance of the impedance matching circuit substantially matches an output impedance of the PA.

24. A transceiver having a power amplifier (PA) and a low noise amplifier (LNA) comprising:
an impedance matching circuit having a first and second output nodes coupled to outputs of the PA and to inputs of the LNA, wherein the impedance matching circuit provides a load impedance to the outputs of the PA; and
a switchable impedance device having an output impedance coupled between the first and second differential output nodes, wherein the switchable impedance device causes an impedance across the first and second output nodes to match the output of the PA when the transceiver is in transmit mode, and wherein the switchable impedance device causes the impedance across the first and second output nodes to match with the inputs of the LNA when the transceiver is in receive mode.

25. The transceiver of claim 24, wherein the load impedance of the impedance matching circuit substantially matches an output impedance of the PA.

* * * * *